United States Patent
Boroch et al.

(10) Patent No.: US 7,231,947 B2
(45) Date of Patent: Jun. 19, 2007

(54) SYSTEM FOR PNEUMATICALLY CONVEYING BULK MATERIALS WITH IMPROVED DISCHARGE ARRANGEMENT

(75) Inventors: Anthony E. Boroch, Montoursville, PA (US); James E. Mothersbaugh, Muncy, PA (US)

(73) Assignee: The Young Industries, Inc., Muncy, PA (US)

( * ) Notice: Subject to any disclaimer, the term of this patent is extended or adjusted under 35 U.S.C. 154(b) by 394 days.

(21) Appl. No.: 10/862,576

(22) Filed: Jun. 8, 2004

(65) Prior Publication Data

US 2005/0269365 A1   Dec. 8, 2005

(51) Int. Cl.
*B65B 1/04* (2006.01)

(52) U.S. Cl. .................. 141/286; 141/10; 141/114; 141/314; 141/315

(58) Field of Classification Search .............. 141/2, 141/4, 7, 10, 114, 285, 286, 314–316
See application file for complete search history.

(56) References Cited

U.S. PATENT DOCUMENTS 3,384,134 A * 5/1968 Hillerns .................. 141/10
3,707,172 A * 12/1972 Obara ..................... 141/59
5,259,425 A * 11/1993 Johnson et al. .......... 141/12
5,518,048 A * 5/1996 Derby .................... 141/80

* cited by examiner

*Primary Examiner*—Timothy L. Maust
(74) *Attorney, Agent, or Firm*—Stevens, Davis, Miller & Mosher, LLP

(57) ABSTRACT

An apparatus for guiding bulk material transported by a pneumatic conveying line or by gravity into a container having an access spout generally consisting of means for supporting the container; a housing mountable on the supporting means including a cylindrical side wall having a lower open end insertable into the spout of the container, a closed upper wall having an opening disposed axially relative to the side wall through which a discharge end portion of the pneumatic conveying line may be inserted, a partition formed of a filter medium disposable between the side wall of the housing and the discharge end portion when such portion is inserted through the upper wall opening of the housing, providing a closed chamber and an open chamber communicating with the lower open end of the housing, and an outlet communicating with the closed chamber; and means mounted on a lower end of the housing side wall selectively operable to engage the spout when the lower end of the cylindrical side wall is inserted into the spout for forming a seal between the lower housing end and the spout.

56 Claims, 3 Drawing Sheets

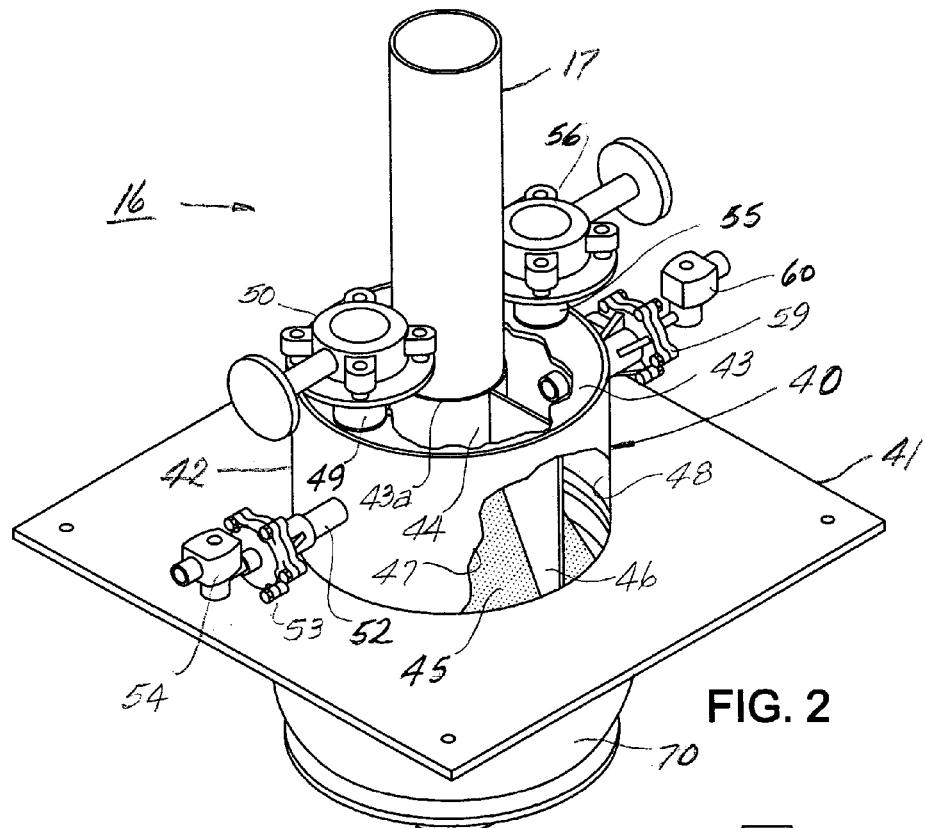
FIG. 2
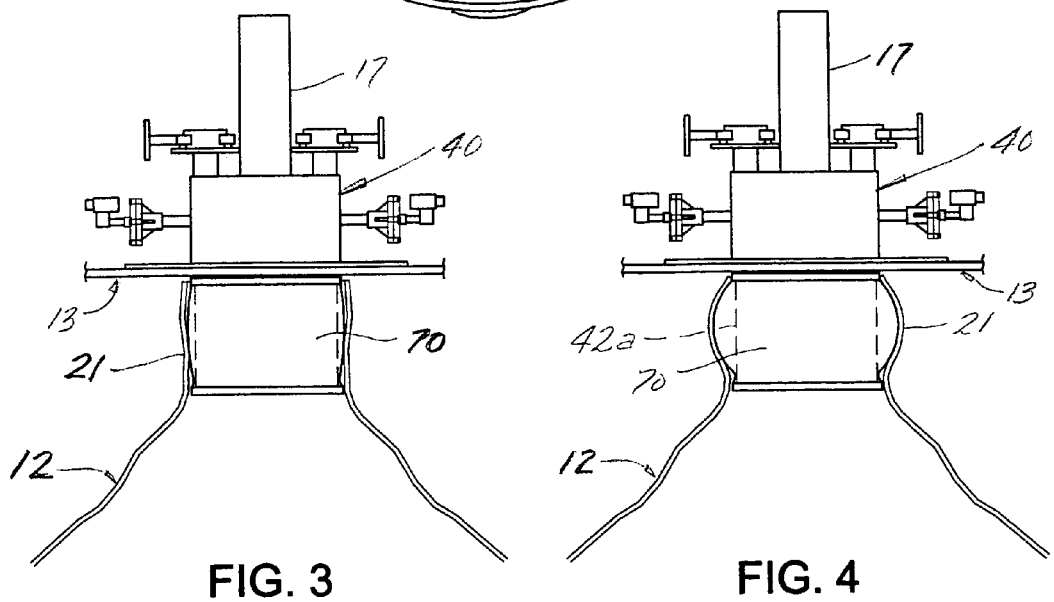
FIG. 3
FIG. 4

SYSTEM FOR PNEUMATICALLY CONVEYING BULK MATERIALS WITH IMPROVED DISCHARGE ARRANGEMENT

This invention relates to a pneumatic conveying system for transporting bulk materials and more particularly to such a system in which airborne particles of such materials at a material discharge site are captured and thus prevented from escaping into the ambient atmosphere.

BACKGROUND OF THE INVENTION

In the use of pneumatic conveying systems for transporting bulk materials to storage, transport or processing sites, the material typically is impelled by a pressurized gas and discharged into a closed compartment. Because of the pressurized air flow utilized in transporting the material, the collection compartment must be ventilated. Otherwise, the normal discharge of material into the compartment will be impaired if not entirely halted. Further because of the nature of some of such material which have a very fine particle size, such as titanium oxide, a portion of such materials become airborne and apt to be vented into the ambient atmosphere with the discharged air. Such escape of airborne material results not only in a contamination of the ambient atmosphere and possible harm to operating personnel but a wasteful loss of product. Accordingly, the principal object of the present invention is to provide a system for pneumatically conveying a bulk material and particularly a material very fine in particle size in which all of the material is deposited at the selected destination site without the loss of any airborne material. Another object of the present invention is to provide an apparatus for filling a container by gravity flow of material in which displaced air is vented and material entrained in vented air is captured.

SUMMARY OF THE INVENTION

The principal and other objects of the present invention are achieved by providing a bulk material handling system generally consisting of means for holding the bulk material, such as a vessel, means for supporting a container having an inlet spout into which the material is to be loaded, means for pneumatically conveying the bulk material, means for dispensing the bulk material from the holding means into the pneumatic conveying means, such as a rotary valve, and an improved apparatus for connecting a discharge end portion of the pneumatic conveying means to the container to be filled, which provides for venting the gas impelling the bulk material while preventing the escape of airborne particles of the material and capturing such particles in the container being filled.

Such apparatus generally consists of a housing mountable on the container supporting means, having a portion insertable into the spout of the container, and a first opening communicating with the interior of the container when the apparatus is disposed on the supporting means, a second opening through which the discharge end portion of the pneumatic conveying means may be inserted into and communicate with the interior of the container when the housing portion of the apparatus is inserted into the spout of the container, a partition formed of a filter medium disposable between a wall of the apparatus housing and the discharge end of the pneumatic conveying means when the discharge end portion of the line is inserted through the second housing opening, providing a first closed chamber and a second chamber communicating with the first housing opening, and a third opening communicating with the closed chamber, and means mounted on the housing portion inserted into the spout of the container, selectively operable to engage the spout when the housing portion of the apparatus is, inserted into the spout, forming a seal between the housing portion of the apparatus received within the spout and the spout.

Preferably, the supporting means for the unloading apparatus includes means for detachably suspending the container therefrom so that the spout for the container opens upwardly, the means for forming a seal between the housing of the loading apparatus and the spout of the container being filled consists of an inflatable, toroidially configured bladder, the housing of the loading apparatus includes an outlet communicating with the closed chamber of such housing and is communicable with a dust collection system, the apparatus housing includes means for injecting a high pressure gas into the closed chamber portion thereof at predetermined times for dislodging material particles deposited on the filter medium. In addition, it is preferred that the closed chamber of the filling apparatus housing be divided into two closed chambers, each provided with an outlet connectable to a dust collection system and means for injecting a high pressure gas into the chamber for dislodging material deposited on the filter medium, thus permitting the backflushing of a portion of the filter medium while continuing to filter venting gas with another portion of the filter medium.

BRIEF DESCRIPTION OF THE DRAWINGS

FIG. 2 is an enlarged view of the section designated by the reference numeral 2 in FIG. 1;

FIG. 3 is a side elevational view of the apparatus shown in FIG. 2, illustrating a lower portion of such apparatus received within the inlet spout of a container to be filled, without a seal being formed between such lower housing portion and the spout of the container;

FIG. 4 is a view similar to the view shown in FIG. 3, illustrating a seal having formed between the lower housing portion of the apparatus and the spout portion of the container.

DETAILED DESCRIPTION OF THE PREFERRED EMBODIMENT OF THE INVENTION

Figure 1:
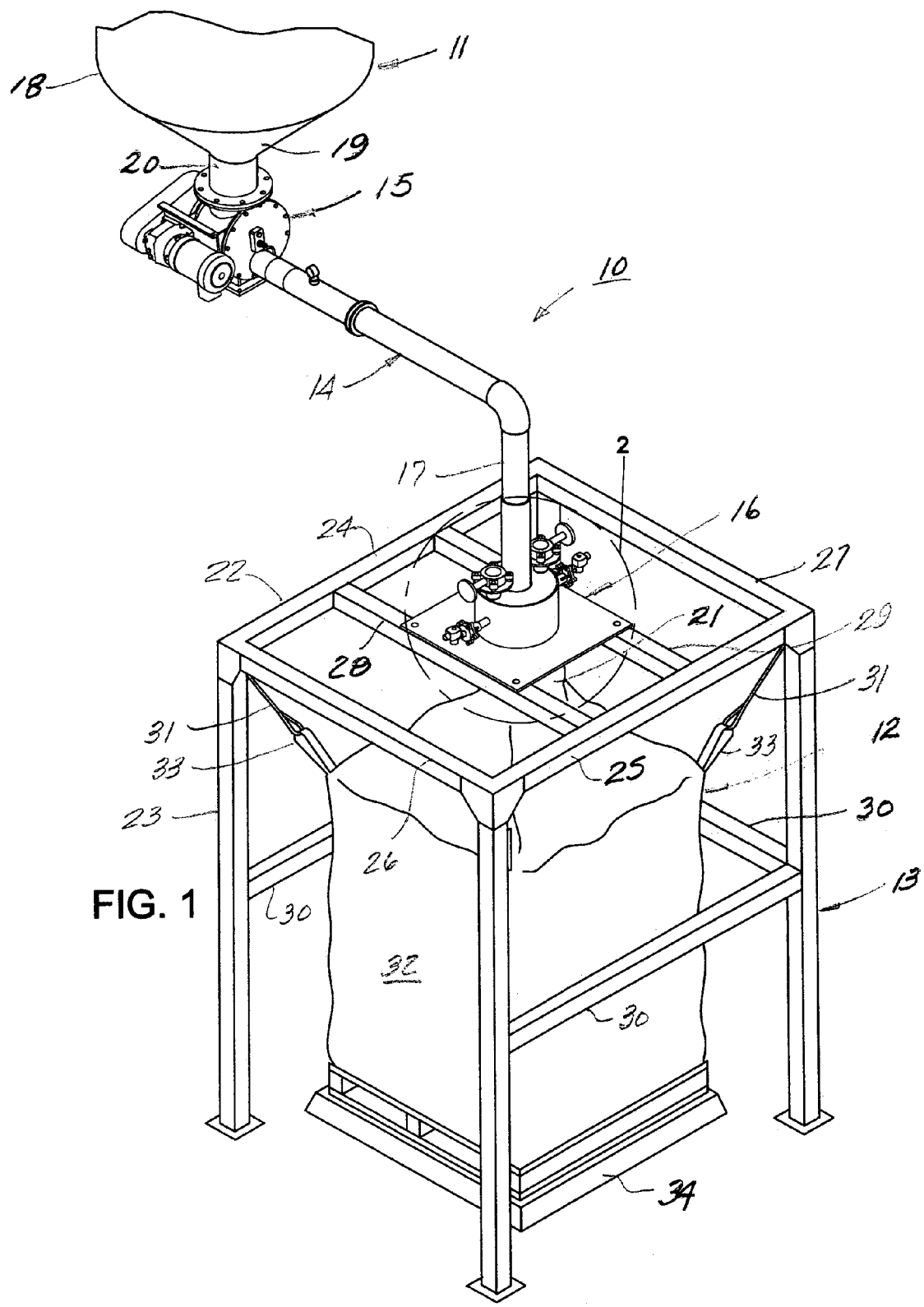
FIG. 1 is a perspective view of a bulk material handling system embodying the present invention, having a portion thereof broken away.

Referring to FIG. 1 of the drawings, there is illustrated a system 10 for pneumatically conveying a bulk material from a first site to a second site without the loss of any such material which generally includes a bulk material holding vessel 11 located at a first site, a bulk bag 12 supported on support structure 13 located at a second site remote from such first site, a transport line for pneumatically conveying material from vessel 11 to bulk bag 12, a rotary valve 15 for dispensing material from vessel 11 into transport line 14 and an apparatus 16 adapted to receive the discharge end portion 17 of the transport line to accommodate the discharge of material into the bulk bag, vent conveying air injected into the bulk bag and recover airborne particles of the material being conveyed. Vessel 11 is of a conventional construction including a cylindrical upper portion 18 and a lower hopper section 19 having a discharge opening communicating with a conduit 20 for feeding material into rotary feed pump 15.

Vessel 11 may be open at the upper end thereof so that material may be gravity fed into feed valve 15 or may be closed at the upper end thereof with the material being fed into valve 15 under pressure. In addition, the hopper portion of the vessel may be aerated to facilitate the flow of material into the feeder valve. Rotary feeder valve 15 also may be of a conventional construction suitable to feed bulk material from the vessel into transport line 14 although it is preferred that such valve consist of a valve as illustrated and described in that certain U.S. Patent application, entitled Rotary Feeder Valve for Pneumatic Conveying System, filed on Jun. 2, 2004. Transport line 11 also may be of conventional construction although it is preferred that such line consists of a pneumatic conveying line as illustrated and described in U.S. Pat. No. 6,609,871 dated Aug. 26, 2003. Such patent and patent application are incorporated herein by reference.

Support structure 13 may be of any construction sufficient to support bulk bag 12 in suspended relation with its access spout 21 opening upwardly, and further support apparatus 16 in cooperating relation with access spout 21 when bulk bag 12 is supported in suspending relation on support structure 13. The support structure is of a simple construction consisting of an upper, horizontal section 22 supported on a set of legs 23. Section 22 consists of a pair of parallel, spaced beams 24 and 25 connected at the ends thereof by a pair of beams 26 and 27 and intermediate at the ends by a pair of beams 28 and 29. Legs 23 are braced by a set of beams 30. The corners of upper section 22 are provided with a set of depending straps 31 from which bulk bag 12 may be suspended. Bulk bag 12 is of a conventional construction including a main body portion 32, inlet spout 21 at an upper end thereof, a closable outlet spout at a bottom end thereof (not shown) and a set of straps 33 which may be connected to depending straps 31 for suspending the bag in the position as shown in FIG. 1. When the bag is to be filled with a bulk material, it may be oriented in the position as shown in FIG. 1 with the access spout in the upper end thereof for receiving the material to be loaded in the bag. In such position, the bag normally would rest on a pallet 34 which may be engaged by the blades of a forklift truck for lifting the bag and transporting it to another site for storage or unloading. During transportation, the flexible spout of the bag may be cinched and folded to prevent loss of material or possibly contamination of the material. When the contents of the bag are to be unloaded, the closable outlet spout would be positioned over a hopper and the outlet spout would be unfolded to open and thus allow the contents of the bag to gravity flow into the receiving hopper.

Referring to FIGS. 2 through 5, apparatus 16 includes a housing 40 extending through and secured to a mounting plate 41 which is adapted to rest on and be secured to cross beam members 28 and 29 of support structure 13 as shown in FIG. 1. Housing 40 includes a cylindrical side wall 42 having a diameter smaller than the diameter of spout 21 of the bulk bag fully opened, and a lower portion 42a adapted to be received within access spout 21 when apparatus 16 is mounted on the support structure and bulk bag 12 is suspended from the support structure as shown in FIG. 1, and a closed upper end 43 having an opening 43a disposed coaxially relative to cylindrical housing wall 42. Depending from upper housing wall 43 and coaxially with opening 43a is a guide conduit 44 having a diameter slightly larger than the diameter of discharge end portion 17 of the pneumatic conveying line for receiving such discharge end portion therein, in communication with the lower end of housing 40. Preferably, however, discharge end portion 17 of the conveying line is coupled to conduit 44 to provide a seal and thus the loss of material.

Interconnecting guide or coupling conduit 44 and cylindrical side wall 42 of housing 40 is a frusto-conically configured partition 45 consisting of the filter medium such as a filter material sold by The Young Industries, Inc. of Muncy, Pa., U.S.A. under the trademark TRANSFLOW. Also provided in the upper end of housing 40 is a pair of baffles 46 spaced 180° apart relative to the axis of conduit 44 and having edges engaging and secured to the upper end of cylindrical side wall 42, partition 45, conduit 44 and upper wall member 43 to provide a pair of closed chambers 47 and 48 in the upper end of housing 40.

Closed chamber 47 is provided with an outlet conduit 49 provided with a butterfly valve 50 operated by an actuator 51. Such chamber further is provided with an inlet conduit 52 provided with a diaphragm valve 53 operated by a solenoid valve 54. Similarly, closed chamber 48 is provided with an outlet conduit 55 having a butterfly valve 56 operated by an actuator 57. It further is provided with an inlet conduit 58 having a diaphragm valve 59 operated by a solenoid valve 60.

Figure 5:
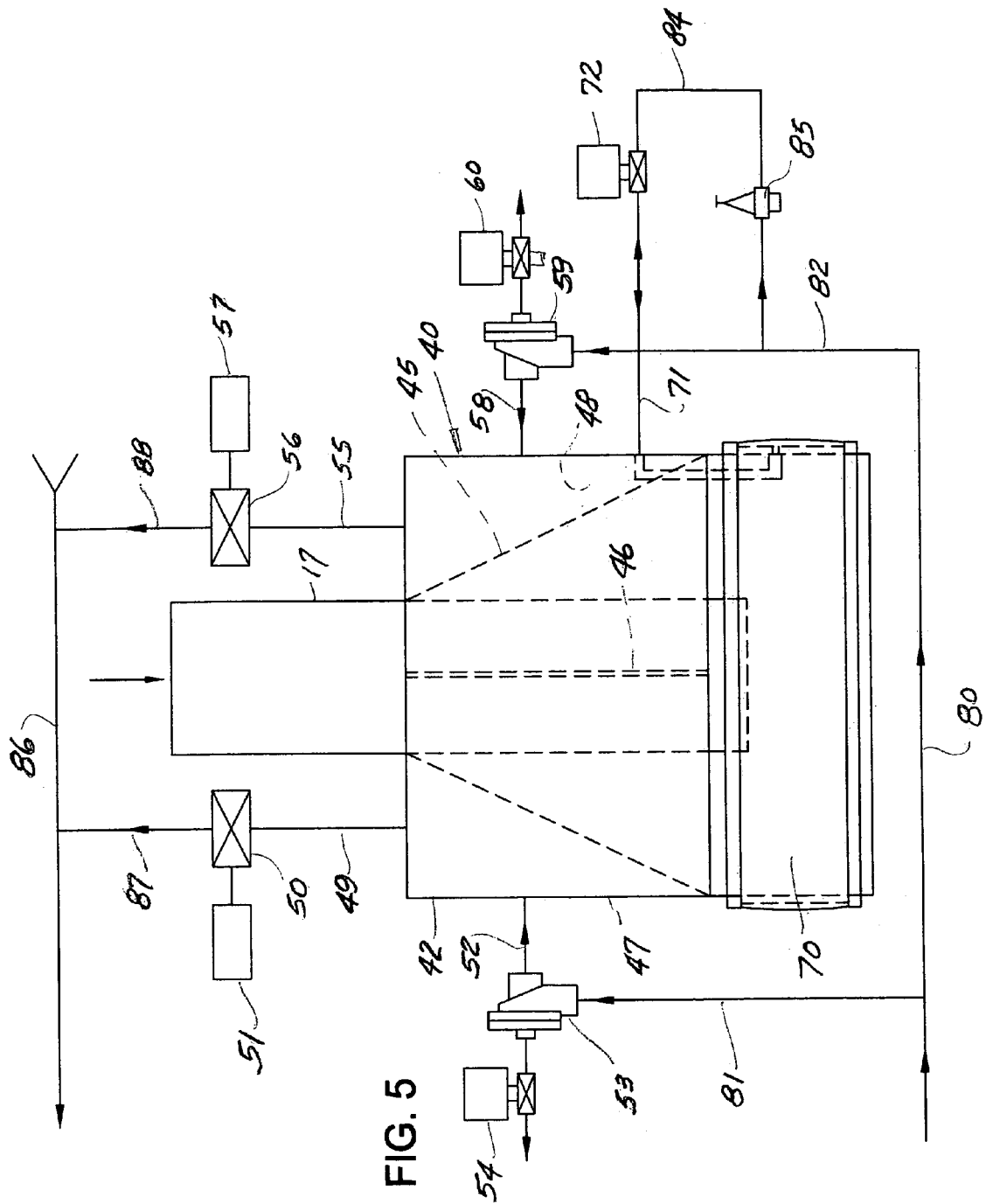
FIG. 5 is a diagramatic-schematic view of the apparatus shown in FIG. 2.

As best shown in FIGS. 3, 4 and 5, mounted on the lower end 42a of housing side wall 42 is an inflatable bladder 70 having a substantially toroidal configuration when fully inflated. Such bladder is provided with an air supply conduit 71 provided with a three-way control valve 72. In this regard, it will be appreciated that when spout 21 is fitted about lower housing portion 42a so that bladder 70 in its deflated condition is disposed between lower housing portion 42a and spout 42, control valve 72 may be operated to inflate bladder 70, causing it to expand radially into engagement with the inner side of spout 21 to form a seal therebetween. In its normal or uninflated condition, bladder 70 may exhaust any internal pressure to atmosphere via three-way control valve's exhaust port.

Referring to FIG. 5, apparatus 16 is provided with a high-pressure air header 80 having branch lines 81 and 82 connected to diaphragm valves 53 and 59, respectively. Branch line 82 further is provided with a line 84 connected to an inlet of bladder 70 in which control valve 72 is connected along with a regulator 85 which functions to regulate the pressure in the inflatable bladder in the range of 1 to 5 psig. A line 86 further is provided which connects to a dust collection system. Butterfly valves 50 and 56 are connected to such line by means of lines 87 and 88, respectively.

The system as described functions to transport a batch of bulk material from vessel 11 to a bulk bag 12 in a manner whereby, initially, the pallet 34 is positioned within support structure 13 below apparatus 16, an empty bulk bag 12 is positioned on or above pallet 34, lifted upwardly and connected to the upper end of the support structure by means of straps 33 with spout 21 positioned below lower housing 42a, the spout is unfolded and fitted around lower housing section 42a as shown in FIG. 3 and then valve 72 is operated to supply air under pressure to bladder 70, causing the bladder to expand radially into sealing engagement with spout 21 as the spout remains positioned about lower housing section 42a, as shown in FIG. 4. Under such circumstances, the bulk bag is postured to receive and be filled with a batch of bulk material from vessel 11.

To convey a batch of material from vessel 11 to bulk bag 21 thus suspended from support structure 13 and connected to apparatus 16, discharge end portion 17 of transport line 14 is inserted into the center opening of apparatus 16 a sufficient distance so that the end portion thereof extends into lower housing section 42a in communication with the interior of the bulk bag through spout 21. Suitable controls are then operated to inject a gas into transport line 14, and operate rotary feed valve 15 for dispensing bulk material from vessel 17 into transport line 14, which is pneumatically conveyed through the transport line and apparatus 16 into bulk bag 12. With butterfly valves 50 and 56 in their open positions, conveying gas injected through discharge end portion 17 and lower housing section 42a into the suspended bag is vented up through housing 40, lines 49 and 55 and line 86 to the dust collection system. As such gas traverses housing 40, airborne particles of material will be filtered out of the vented gases by filter medium 45.

To dislodge material accumulating on the pressure side of the filter medium, solenoid valves 54 and 60 periodically are alternatively operated to inject burst of high pressure gas into closed chambers 47 and 48. Although two separate paths are provided for venting the conveying air with filtering means, a single such path can be provided within the scope of the invention. Two or more separate paths, however, is preferred in that separate paths permits one of such paths to be isolated by closing one of butterfly valves 50 or 56 and opening an associated valve 53 or 59 to backwash one portion of the filter medium in one path while permitting venting and filtering of airborne particles in the other path.

As material is pneumatically conveyed into the suspended bag, conveying air is vented through two separate paths as airborne particles are filtered out and such separate paths are alternately isolated to backwash a filter section in one of the paths, the inflated bladder engaging the open spout in sealing relation prevents airborne particles from escaping into the ambient atmosphere to possibly contaminate the atmosphere and cause harm to operating personnel in the vicinity of the filling operation. The sealing of the spout and the filtering of airborne particles in the venting gas serves not only to prevent the escape of such material but to capture it and thus provide a greater yield of material filled into the bag. Once the bag has been filled to a desired level, the injection of high pressure conveying gas in transport line 42 and the operation of rotary feeder valve 15 are discontinued, valve 32 is operated to vent air from bladder 70 and thus allow it to deflate and collapse against lower housing section 42a as shown in FIG. 3. With the spout thus having been disconnected, it may be cinched and folded against the main body portion of the bag, ready to be removed by a forklift truck and thus transported to another storage, transport or processing site. In unloading such bulk bag, the bag would be suspended over a suitable hopper, the discharge spout would be untied and unfolded and the material would be allowed to gravity flow into the hopper.

Although other configurations of the filter medium may be used within the scope of the invention, it is preferred that such medium have a frusto-conical configuration in that it provides a greater filtering surface in a given space in the path of the venting gas. With respect to the conveying gas, any gas compatible with the material being conveyed may be used. In most applications, ordinary air may be used. Where the material being conveyed is reactive to certain gases, various inert gases such as nitrogen may be employed. As previously indicated, the embodiment described provides for injecting a high pressure gas into closed chambers 47 and 48 at predetermined times. Such injection may be periodic or randomly responsive to the sensing of a selected pressure differential across the filter medium. Although apparatus 16 has been described as a component of a system for discharging material conveyed by a pneumatic conveying line from a vessel to a remotely situated container, it is to be understood that such apparatus equally and effectively may be used to fill a container by gravity flow of material from an overhead vessel. In such alternative application, the apparatus is equally effective in venting displaced air and recovering material entrained in the vented air. In lieu of a discharge portion of a transport line being guided or coupled to conduit 44, a discharge spout of an overhead vessel would be sealingly connected to conduit 44.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

We claim:

1. A bulk material handling system comprising:
means for holding said bulk material;
means for supporting a container having an access spout;
means for pneumatically conveying said bulk material;
means for dispensing said bulk material from said holding means into said pneumatically conveying means; and
an apparatus including a housing having a portion thereof insertable into the spout of said container and a first opening communicating with the interior of said container when said container is disposed on said supporting means, means mounted on said housing portion and selectively operable to engage said spout when said housing portion is inserted into said spout for forming a seal between said housing portion and said spout, a second opening through which a discharge end of said pneumatically conveying means may be inserted to communicate with the interior of said container when said container is disposed on said supporting means and said housing portion is inserted into said spout, a partition formed of a filter medium disposable between a portion of said housing and said discharge end of said pneumatically conveying means when said discharge end is inserted through said second housing opening providing a first closed chamber and a second chamber communicating with said first housing opening, and an outlet communicating with said closed chamber.

2. A system according to claim 1 wherein said apparatus includes means for mounting said apparatus on said supporting means.

3. A system according to claim 2 wherein said mounting means comprises a plate member secured to said housing and seated on said supporting means.

4. A system according to claim 1 wherein said supporting means of said apparatus includes means for suspending said container therefrom.

5. A system according to claim 4 wherein said suspending means includes a set of straps to which straps of said container may be attached.

6. A system according to claim 1 wherein said seal forming means of said apparatus comprises an inflatable bladder.

7. An apparatus according to claim 6 wherein said inflatable bladder has a substantially toroidal configuration upon being fully inflating, engaging said spout in sealing relation therewith.

8. A system according to claim 1 including a conduit communicating with said housing outlet and communicable with a dust collection system, and a selectively operable valve disposed in said conduit.

9. A system according to claim 1 including means for injecting a high pressure gas into said closed chamber of said apparatus at predetermined times.

10. A system according to claim 8 including means for periodically injecting said high pressure gas into said closed chamber.

11. A system according to claim 8 including means for sensing the pressure differential across said partition formed of a filter medium, and wherein said means for injecting a high pressure gas into said closed chamber is operable responsive to a selected pressure differential.

12. An assembly for handling bulk material comprising:
means for supporting a container having an access spout;
means for pneumatically conveying said bulk material, having it discharge end portion; and
an apparatus including a housing having a portion thereof insertable into the spout of said container and a first opening communicating with the interior of said container when said container is disposed on said supporting means, means mounted on said housing portion and selectively operable to engage said spout when said housing portion is inserted into said spout for forming a seal between said housing portion and said spout, a second opening through which said discharge end portion of said pneumatically conveying means may be inserted to communicate with the interior of said container when said container is disposed on said supporting means and said housing portion is inserted into said spout, a partition formed of a filter medium disposable between a portion of said housing and said discharge end portion of said pneumatically conveying means when said discharge end portion is inserted through said second housing opening, providing a first closed chamber and a second chamber communicating with said first housing opening and an outlet communicating with said closed chamber.

13. An assembly according to claim 12 wherein said apparatus includes means for mounting said apparatus on said supporting means.

14. An assembly according to claim 12 wherein said supporting means of said apparatus includes means for suspending said container therefrom.

15. An assembly according to claim 12 wherein said seal forming means of said apparatus comprises an inflatable bladder.

16. An assembly according to claim 12 including a conduit communicating with said housing outlet and communicable with a dust collection system and a selectively operable valve disposed in said conduit.

17. An assembly according to claim 12 including means for injecting a high pressure gas into said closed chamber of said apparatus at predetermined times.

18. An assembly according to claim 17 including means for periodically injecting said high pressure gas into said closed chamber.

19. An assembly according to claim 17 including means for sensing the pressure differential across said partition formed of a filter medium, and wherein said means for injecting a high pressure gas into said closed chamber is operable responsive to a selected pressure differential.

20. An apparatus for unloading bulk material transported by a pneumatic conveying line having a discharge end portion, into a container having an access spout comprising:
means for supporting said container;
a housing mountable on said supporting means having a portion insertable into the spout of said container and a first opening communicating with the interior of said container when said container is disposed on said supporting means, a second opening into which said discharge end portion of said pneumatic conveying line may be inserted to communicate with the interior of said container when said housing portion is inserted into said spout, a partition formed of a filter medium disposable between a wall of said housing and said discharge end portion of said pneumatic conveying line when said discharge end portion is inserted into said second housing opening, providing a first closed chamber and a second chamber communicating with said first housing opening and a third opening communicating with said closed chamber; and
means mounted on said housing portion and selectively operable to engage said spout when said housing portion is inserted into said spout, forming a seal between said housing portion and said spout.

21. An apparatus according to claim 20 wherein said housing includes means for mounting said apparatus on said supporting means.

22. An apparatus according to claim 20 wherein said mounting means comprises a plate member secured to said housing and seated on said supporting means.

23. An apparatus according to claim 20 wherein said supporting means of said apparatus includes means for suspending said container therefrom.

24. An apparatus according to claim 23 wherein said supporting means includes a set of straps on which straps of said container may be attached.

25. An apparatus according to claim 20 wherein said seal forming means of said apparatus comprises an inflatable bladder.

26. An apparatus according to claim 20 including a conduit communicating with said housing opening and communicable with a dust collection system, and a selectively operable valve disposed in said conduit.

27. An apparatus according to claim 20 including means for injecting a high pressure gas into said closed chamber of said apparatus at predetermined times.

28. An apparatus according to claim 27 including means for periodically injecting said high pressure gas into said closed chamber.

29. An apparatus according to claim 27 including means for sensing the pressure differential across said partition formed of a filter medium, and wherein said means for injecting a high pressure gas into said closed chamber is operable responsive to a selected pressure differential.

30. An apparatus according to claim 20 including means partitioning said closed chamber of said housing into first and second closed chambers, and wherein said housing includes a pair of outlets each communicating with one of said first and second closed chambers and communicable with a dust collection system.

31. An apparatus according to claim 30 including means for injecting a high pressure gas into a selected one of said first and second closed chambers at predetermined times.

32. An apparatus for unloading bulk material transported by a pneumatic conveying line having a discharge end portion, into a container having an access spout comprising:
means for supporting said container;
a housing mountable on said supporting means including a cylindrical side wall having a lower open end insertable into the spout of said container so that said open end communicates with the interior of said container when said container is disposed on said supporting means, a closed upper wall having an opening disposed axially relative to said side wall through which said discharge end portion of said pneumatic conveying line may be inserted to communicate with the interior of said container when said lower housing portion is inserted into said spout, a partition formed of a filter medium disposable between said side wall of said housing and said discharge end portion of said pneumatic conveying line when said discharge end portion is inserted through said upper wall opening, providing a first closed chamber and a second open chamber communicating with said lower open end of said housing, and an outlet communicable with said closed chamber; and means mounted on a lower end of said cylindrical side wall, selectively operable to engage said spout when said lower end of said cylindrical side wall is inserted into said spout for forming a seal between said housing portion and said spout.

33. An apparatus according to claim 32 wherein said apparatus includes means for mounting said housing on said supporting means.

34. An apparatus according to claim 32 wherein said mounting means comprises a plate member secured to said side wall of said housing and seated on said supporting means.

35. An apparatus according to claim 32 wherein said supporting means of said apparatus includes means for suspending said container therefrom.

36. An apparatus according to claim 35 wherein said suspending means includes a set of straps to which straps of said container may be attached.

37. An apparatus according to claim 32 wherein said seal forming means of said apparatus comprises an inflatable bladder.

38. An apparatus according to claim 32 including a conduit communicating with said housing outlet and communicable with a dust collection system, and a selectively operable valve disposed in said conduit.

39. An apparatus according to claim 32 including means for injecting a high pressure gas into said closed chamber of said housing at predetermined times.

40. An apparatus according to claim 39 including means for periodically injecting said high pressure gas into said closed chamber.

41. An apparatus according to claim 39 including means for sensing the pressure differential across said partition formed of a filter medium, and wherein said means for injecting a high pressure gas into said closed chamber is operable responsive to a selected pressure differential.

42. An apparatus according to claim 32 wherein said partition has a frusto-conical configuration.

43. An apparatus according to claim 32 wherein said housing includes a conduit disposed coaxially relative to said side wall of said housing for guiding said discharge end portion of said pneumatic conveying line into said housing.

44. An apparatus according to claim 32 including means partitioning said closed chamber of said housing into first and second closed chambers, and wherein said housing includes a pair of outlets each communicating with one of said first and second closed chambers and communicable with a dust collection system.

45. An apparatus according to claim 44 including means for injecting a high pressure gas into a selected one of said first and second closed chambers at predetermined times.

46. An apparatus for guiding the gravity flow of bulk material from a discharge end portion of overhead vessel into a container having an access spout comprising:

means for supporting said container;

a housing mountable on said supporting means having a portion insertable into the spout of said container and a first opening communicating with the interior of said container when said container is disposed on said supporting means, a second opening into which said discharge end portion of said vessel may be inserted to communicate with the interior of said container when said housing portion is inserted into said spout, a partition formed of a filter medium disposable between a wall of said housing and said discharge end portion of said vessel when said discharge end portion is inserted into said second housing opening, providing a first closed chamber and a second chamber communicating with said first housing opening and a third opening communicating with said closed chamber; and means mounted on said housing portion and selectively operable to engage said spout when said housing portion is inserted into said spout, forming a seal between said housing portion and said spout.

47. An apparatus according to claim 46 wherein said housing includes means for mounting said apparatus on said supporting means.

48. An apparatus according to claim 46 wherein said mounting means comprises a plate member secured to said housing and seated on said supporting means.

49. An apparatus according to claim 46 wherein said supporting means of said apparatus includes means for suspending said container therefrom.

50. An apparatus according to claim 46 wherein said seal forming means of said apparatus comprises an inflatable bladder.

51. An apparatus according to claim 46 including a conduit communicating with said housing opening and communicable with a dust collection system, and a selectively operable valve disposed in said conduit.

52. An apparatus according to claim 46 including means for injecting a high pressure gas into said closed chamber of said apparatus at predetermined times.

53. An apparatus according to claim 52 including means for periodically injecting said high pressure gas into said closed chamber.

54. An apparatus according to claim 52 including means for sensing the pressure differential across said partition formed of a filter medium, and wherein said means for injecting a high pressure gas into said closed chamber is operable responsive to a selected pressure differential.

55. An apparatus according to claim 46 including means partitioning said closed chamber of said housing into first and second closed chambers, and wherein said housing includes a pair of outlets each communicating with one of said first and second closed chambers and communicable with a dust collection system.

56. An apparatus according to claim 55 including means for injecting a high pressure gas into a selected one of said first and second closed chambers at predetermined times.

* * * * *

UNITED STATES PATENT AND TRADEMARK OFFICE
CERTIFICATE OF CORRECTION

PATENT NO. : 7,231,947 B2  
APPLICATION NO. : 10/862576  
DATED : June 19, 2007  
INVENTOR(S) : Anthony E. Boroch and James E. Mothersbaugh Page 1 of 1

It is certified that error appears in the above-identified patent and that said Letters Patent is hereby corrected as shown below:

Col. 7, line 1 of claim 10, the reference to "claim 8" should be corrected to read "claim 9".

Col. 7, line 1 of claim 11, the reference to "claim 8" should be corrected to read "claim 9".

Col. 9, line 1 of claim 34, the reference to "claim 32" should be corrected to read "claim 33".

Signed and Sealed this

Tenth Day of March, 2009

JOHN DOLL  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,231,947 B2 | Page 1 of 1 |
| APPLICATION NO. | : 10/862576 | |
| DATED | : June 19, 2007 | |
| INVENTOR(S) | : Anthony E. Boroch and James E. Mothersbaugh | |

It is certified that error appears in the above-identified patent and that said Letters Patent is hereby corrected as shown below:

Col. 7, line 6, claim 10, the reference to "claim 8" should be corrected to read "claim 9".

Col. 7, line 9, claim 11, the reference to "claim 8" should be corrected to read "claim 9".

Col. 9, line 24, claim 34, the reference to "claim 32" should be corrected to read "claim 33".

This certificate supersedes the Certificate of Correction issued March 10, 2009.

Signed and Sealed this

Thirty-first Day of March, 2009

JOHN DOLL
*Acting Director of the United States Patent and Trademark Office*